UNITED STATES PATENT OFFICE.

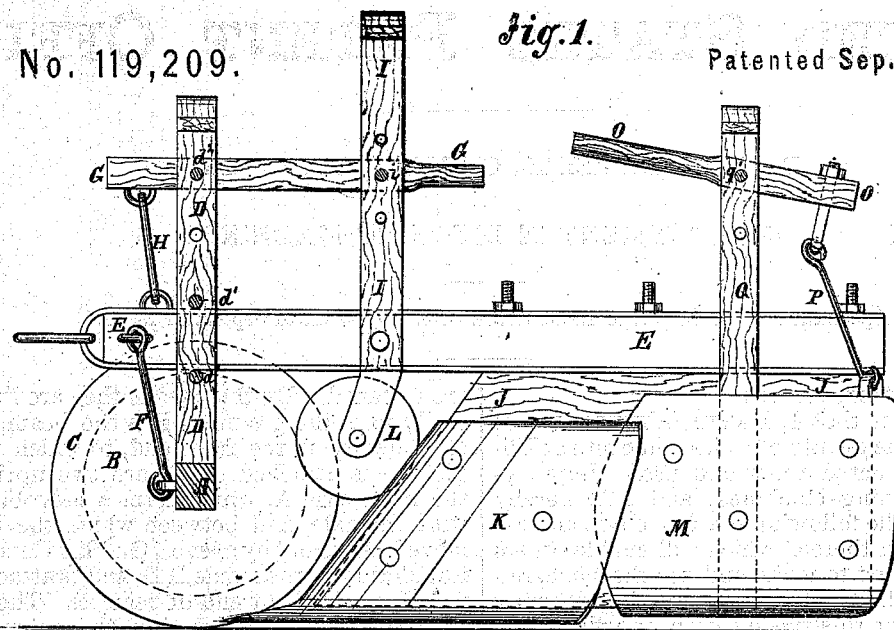
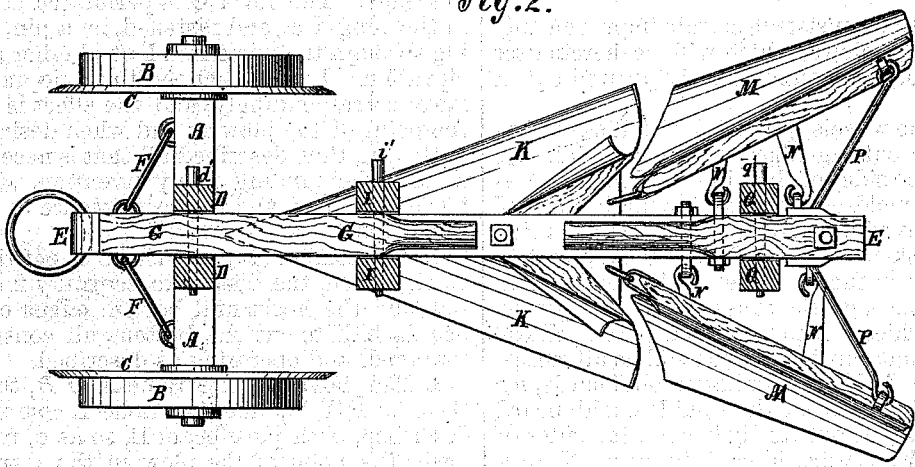

DAVID WHITESELL, OF MATTOON, ILLINOIS.

IMPROVEMENT IN DITCHING-MACHINES.

Specification forming part of Letters Patent No. 119,209, dated September 19, 1871.

*To all whom it may concern:*

Be it known that I, DAVID WHITESELL, of Mattoon, in the county of Coles and State of Illinois, have invented a new and useful Improvement in Ditching-Machines; and I do hereby declare that the following is a full, clear, and exact description thereof, which will enable others skilled in the art to make and use the same, reference being had to the accompanying drawing forming part of this specification, in which—

Figure 1 is a side view of my improved machine, one of the wheels being removed to show the construction. Fig. 2 is a top view of the same, the upper part of the uprights being removed to show the construction.

Similar letters of reference indicate corresponding parts.

My invention consists in certain improvements upon ditching-plows, which will be hereinafter fully described and subsequently pointed out in the claims.

B B are the wheels, provided with disk C, having annular cutting-edges on their peripheries which cut the sides of the ditch. K K are sides of a double mold-board plow, having horizontal cutting-edges which extend out to a point in line with the disk-cutters C. L is a rotary cutter, placed between the two sides of the mold-board, which cuts through the grass-sod of the furrow-slice and divides it into two equal parts. These three instrumentalities cut the soil at all necessary points. M M are auxiliary mold-boards, for receiving the soil from the double mold-board and expressing it outwardly beyond the sides of the ditch. These are hinged, by arms N, to a standard, J, which is rigidly attached to the beam. Q Q are uprights, one on each side of the beam, in which is pivoted a lever, O. This lever is attached, by rods P, to the further ends of mold-boards M, or to the pieces to which they are fastened. By this means they are lifted laterally from the ground. E is the beam, having some device at the front end, to which the single-tree is attached. D D are two uprights on the front axle A, which form a movable frame with the axle, and between which the beam is moved vertically by a lever, G. This lever G has its fulcrum in the frame D D, and is attached, by rod H, to the front end of beam E. The rods F F fasten the end of beam to the outer ends of axle to bring the strain on the wheels in the line of draft of the beam. It will be perceived that $d^2$ is a shifting fulcrum, upon which the lever G turns. As this fulcrum in the axle-frame receives the pressure from the long or power end of lever G the wheels are forced forward and the fulcrum descends. This lever G is perforated at a point in the long arm, and fastened, by a pin, $i'$, passing through the uprights I I, at a higher or lower elevation. In this manner the axle and beam move correspondingly, and the effect is to raise the point of the plow as and when desired.

Having thus described all that is necessary to a full understanding of my invention, what I esteem to be new, and desire to secure by Letters Patent, is—

1. The combination of disks C to cut the sides of the ditch, the disk L to centrally incise the sod, and the horizontal bottom edges of mold-boards K K to cut the bottom, all constructed, arranged, and operating as described.

2. The movable axle-frame A D D, the lever G, links F F H, and the frame I, combined, as described, with plow-beam E, so as to raise and lower the point of the plow in the manner described.

DAVID WHITESELL.

Witnesses:
D. T. MCINTYRE,
SAMUEL KESSLER.